United States Patent [19]

Simoudis

[11] Patent Number: 5,224,206
[45] Date of Patent: Jun. 29, 1993

[54] SYSTEM AND METHOD FOR RETRIEVING JUSTIFIABLY RELEVANT CASES FROM A CASE LIBRARY

[75] Inventor: Evangelos Simoudis, West Newton, Mass.

[73] Assignee: Digital Equipment Corporation, Maynard, Mass.

[21] Appl. No.: 869,203

[22] Filed: Apr. 13, 1992

Related U.S. Application Data

[63] Continuation of Ser. No. 444,822, Dec. 1, 1989.

[51] Int. Cl.⁵ .............................................. G06F 15/18
[52] U.S. Cl. ........................................ 395/77; 395/51
[58] Field of Search .............................. 395/77, 50, 51

[56] References Cited

U.S. PATENT DOCUMENTS

| | | | |
|---|---|---|---|
| 4,642,762 | 2/1987 | Fisanick | 364/300 |
| 4,649,515 | 3/1987 | Thompson et al. | 364/900 |
| 4,670,848 | 6/1987 | Schramm | 364/513 |
| 4,713,775 | 12/1987 | Scott et al. | 364/513 |
| 4,811,217 | 3/1989 | Tokizane et al. | 364/300 |

OTHER PUBLICATIONS

Simoudis et al., "Validated Retrievel in Case-Based Reasoning", Proc. 8th National Conf. on Artificial Intelligence Jul. 1990, 310–315.
Koton, P. A., "Using Experience in Learning and Problem Solving", PhD Thesis, MIT, Oct. 1988.
Barletta et al., "Explanation Based Indexing of Case", Proceedings of AAAI-88, Aug. 1988.
Koton, P., "Using a Case Memory to Integrate Case-Based and Causal Reasoning", Case-Based Reasoning Workshop, Aug. 1988, pp. 74–81.
Hammond et al., "Extracting Diagnostic Features from Explanations", Case-Based Reasoning WS, Aug. 1988.
Kopeikina et al., "Case Based Reasoning for Continuous Control", Proc. Workshop Case-Based Reasoning, 1988, 250–259.
Riesbeck and Schank, Inside Case-Based Reasoning, Lawrence Erlbaum Assoc., 1989, pp. 25–91.
Koton, Phyllis, "Reasoning About Evidence in Causal Explanations", Proc. Workshop on Case-Based Reasoning, 1988, 260–270.
Ashley et al., "Compare and Contrast, A Test of Expertise", Proc. Workshop on Case-Based Reasoning, 1988, 31–36.
Kass et al., "Case-Based Reasoning Applied to Constructing Explanations", Proc-Workshop on Case-Based Reasoning, 1988, 190–208.

Primary Examiner—Michael R. Fleming
Assistant Examiner—Robert W. Downs
Attorney, Agent, or Firm—Kenyon & Kenyon

[57] ABSTRACT

A case-based retrieval system and method for using same for retrieving justifiably relevant cases from a case library in which past problem solving experiences (cases) are stored. The system obtains the symptoms of a new problem. A set of cases are initially retrieved from the case library based on the symptoms of the new problem. It is then determined for each initially retrieved case using a casual explanation for the case whether the case is justifiably relevant to the new problem, with only justifiably relevant cases being returned to the user of the system.

7 Claims, 3 Drawing Sheets

SYSTEM AND METHOD FOR RETRIEVING JUSTIFIABLY RELEVANT CASES FROM A CASE LIBRARY

This is a continuation of application Ser. No. 07/444,822, filed Dec. 1, 1989, entitled A SYSTEM AND METHOD FOR RETRIEVING JUSTIFIABLY RELEVANT CASES FROM A CASE LIBRARY.

FIELD OF THE INVENTION

The present invention relates to a method and apparatus for retrieving justifiably relevant cases from a case library in order to solve a problem. More specifically, the invention relates to an artificial intelligence case-based reasoning system which retrieves stored cases that are relevant to a problem presented to the reasoning system, these retrieved cases presenting a solution to the presented problem.

BACKGROUND OF THE INVENTION

Case based reasoning is an artificial intelligence technique implemented with a computer that accepts the description of a problem and uses a database of past cases in order to find a solution to the problem at hand. The term "case" refers to a problem-solving experience.

A case-based reasoning system has as its major components a case retriever, a case reasoner, and a case library. The case retriever retrieves one or more cases that is stored in the case library each time a new problem needs to be solved. The case reasoner obtains these cases from the case retriever and will present the solution to the user, or modify the solutions of the retrieved cases as appropriate in order to solve the new problem.

One known case-based reasoning system is set forth in Koton, "Using a Case Memory to Integrate Case-Based and Causal Reasoning," *Case-Based Reasoning Workshop*, Aug. 23, 1988, pp. 74-81, which is applied in the area of medical diagnosis. In this system, each case contains the symptoms of a patient, the diagnosis of his problem, and a therapy. The system retrieves cases which appear relevant to the problem that it is trying to solve, and uses domain knowledge in order to "justify" that each retrieved case was indeed relevant. However, this known system has no capability to learn the results of a justification attempt in order to use these results to justify or nullify other cases that are initially retrieved. Furthermore, this system assumes that the cases retrieved are relevant, and also that the number of cases that are retrieved are few in number. By making these assumptions, this medical diagnosis case-based reasoning system concentrates on how to modify the therapy that is associated with the retrieved case, rather than assuring that the retrieved cases are justifiably relevant.

Another case-based reasoning system is discussed in Hammond et al., "Extracting Diagnostic Features from Explanations," Department of Computer Science, The University of Chicago, pp. 167-178, which is directed to the diagnosis and repair of lawn mowers. Each case in the case library consists of the diagnosis of a particular lawn mower problem and the repair that fixes this problem. In this system, it is assumed that only one set of related cases would be retrieved, something that is not always possible to guarantee. In order to justify each retrieved case, the system uses what are known as backward chaining rules. Using such rules will prevent the system from scaling up, (increasing the size of the rules to increase the depth of the system) since for a realistic data base the number of backward chaining rules may be prohibitively large. In this system, the results of the justification process are not learned and as a result, they cannot be utilized in the justification of other retrieved cases in the set of related cases that are initially retrieved.

Other existing case-base reasoning systems essentially make two assumptions. The first assumption is that the case retrieval components will retrieve only one case from the case library each time a new problem needs to be solved. The second assumption is that the retrieved case will be a justifiably relevant case. The existing systems, therefore, concentrate on how to modify the solution which is associated with a retrieved case in order to solve a new problem. In order to guarantee that only one case is retrieved from the case library, these existing systems use various methods for organizing the case library, and rely on heuristic techniques in order to determine how to best search the case library. However, they do not check whether the retrieved case is truly (or justifiably) relevant. In other words, they do not check beyond the surface similarities shared between the retrieved case and the new problem.

A human user should be presented with cases that are justifiably relevant in order to reduce the amount of time needed to solve a new problem presented to the system. Presentation of a large number of non-justifiably relevant cases will cause the user to attempt a number of solutions that will be inappropriate to the new problem. There is, therefore, a need for a case-based reasoning system in which only cases that are justifiably relevant are retrieved and presented to a case reasoner and ultimately the user of the system.

SUMMARY OF THE INVENTION

A case retrieval component, which can be used by itself or in conjunction with a case based reasoning system, that returns cases which are justifiably relevant to a problem is provided by the present invention which includes a method of performing case-based reasoning with a case-based reasoning system. The system utilizes a case library, a case retriever and a case reasoner. The method comprises obtaining symptoms of a new problem, and retrieving a set of cases stored in a case library based upon the symptoms of the problem. Each case has symptoms, a causal explanation, and a solution. It is then determined whether a case and the set of cases that is retrieved is justifiably relevant to the problem based upon the causal explanation of the case. Those cases that have been determined to be justifiably relevant to the problem are then returned to a user of the case-based reasoning system or to a case reasoner. In certain embodiments, there is a further step of learning whether other cases in the set of retrieved cases are justifiably relevant to the problem. This is done based upon the information obtained during the determining step.

The present invention provides a case retrieval system which performs an initial retrieval of cases from a case library based upon the surface features or symptoms of a problem. However, the present invention examines this set of retrieved cases to determine whether each case is justifiably relevant to the problem. It does this based upon the causal explanation of the case. In this manner, only justifiably relevant cases will be returned to a user, so that the user will not waste time attempting to apply an incorrect solution to a problem.

DETAILED DESCRIPTION

Figure 1:
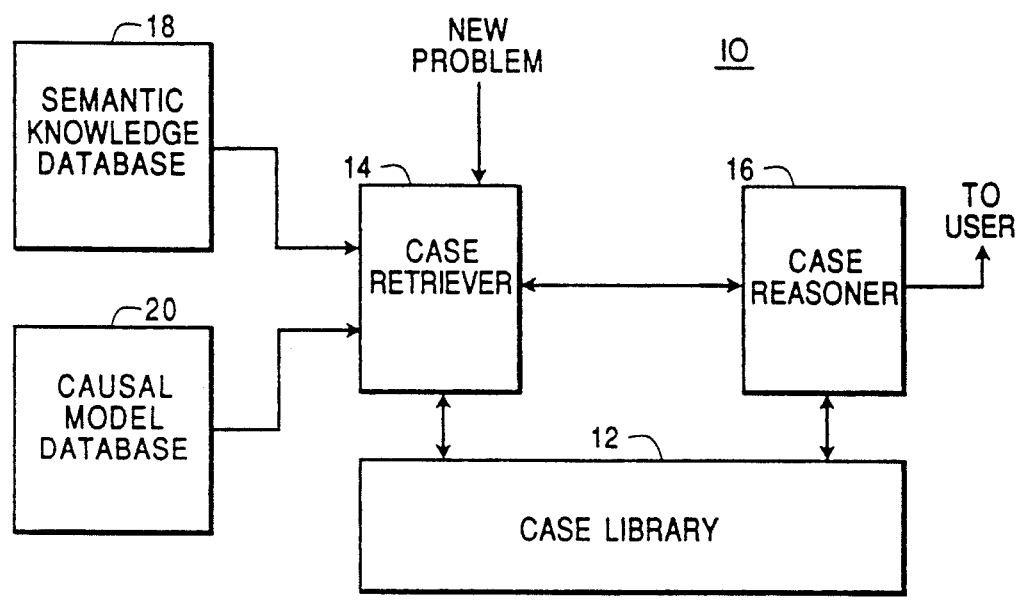
FIG. 1 is a block diagram of a case-based reasoning system constructed in accordance with an embodiment of the present invention.

A case-based reasoning system is shown in FIG. 1 and is designated by reference numeral 10. The system 10 can be used in many applications, such as software analysis, hardware analysis, routine design, etc. As such, a general overview of the system 10 and its operation will first be described. However, for purposes of clarity and explanation, a more detailed description of the operation of the system 10 will be given with reference to a specific application of the system 10. The description of the specific application of the system 10 should make certain terms describing the invention more clear, but the invention is not limited to this specific application.

The system 10 shown in FIG. 1 has a case library 12 in which a number of cases are stored. In the present invention, a case is a database entry that includes the symptoms of the problem, the cause of a problem, and a solution to the problem. When a new problem is presented to the system 10, the information (or symptoms) relating to the new problem is input into a case retriever 14. The new problem is examined by the case retriever 14 in order to determine the most important features of the new problem. Using these most important features, the case retriever 14 queries the case library and retrieves cases that are initially deemed appropriate to the new problem.

The case retriever 14 forms the query (i.e. determines the features that are most important) using semantic knowledge stored in a semantic knowledge database 18. The term "semantic knowledge" refers to what can be considered as general knowledge including attributes and relations between these attributes of the specific domain or application on which the system 10 is being used. This will be made more clear when specific exemplary embodiments are described.

Once the case retriever 14 has retrieved cases from the case library 12 using the semantic knowledge contained in the semantic knowledge database 18, the case retriever 14 then performs a justification for each of the cases which have been retrieved. This justification involves performing one of two actions. The first action is the acceptance of a retrieved case because it is justifiably relevant to the problem being solved, which leads to automatic acceptance of the other retrieved cases which are deemed similarly relevant to the current problem. This automatic acceptance of other retrieved cases will be based upon the information that is learned during the justification of the case which the case retriever 14 is considering, and will be described in more detail later.

The second action is the rejection of a retrieved case because it is not relevant, with automatic rejection of the other retrieved cases which are also deemed irrelevant to the current problem. This automatic rejection will also be based upon the information that is being learned during the justification of the case that the case retriever 14 is considering.

This learning during the justification of a case is a first type of learning performed by the case-based reasoning system of the present invention. A second type of learning occurs after the new problem has been solved (or not solved), with the information gained during the problem solving session being stored as a new case in the case library 12. This second type of learning can be considered to be a permanent type of learning compared to the first type, which is discarded after the problem solving session.

The justification is performed by trying to match to the new problem a "causal explanation" that is included in the retrieved case being justified. Matching involves the performing of tests on the new problem and interpreting the results of each test with respect to the corresponding results of the case whose causal explanation is being used. If the matching succeeds, then the retrieved case is considered to be justifiably relevant because it can explain what could have caused the new problem. The components of a causal explanation are: the cause of the problem; the causal steps which support the validity of the cause (henceforth known as the support steps); and the manifestation of the problem.

There is a match of the causal explanation of a retrieved case to a new problem when the following two conditions are satisfied. The first is that the manifestation of the problem in the retrieved case matches exactly the manifestation of the new problem. The other condition that must be satisfied to provide a match is that the support steps of the causal explanation of the retrieved case either explain exactly what has caused the new problem, or they can be modified in a way so that the support steps will provide the explanation.

The matching of a causal explanation requires that the case retriever 14 have access to what is known as a "causal model". A causal model is used to produce the causal explanation that is associated with the retrieved case that is being justified. Access to this causal model allows the case retriever 14 to interpret the results of the matching process and determine which support steps in the causal explanation can be modified. A causal model is defined as a representation of a device's structure and behavior. A more detailed description of a causal model will be provided later with reference to a specific embodiment of the invention.

Further, the case retriever 14 will also use the causal model in the new problem in order to accept or reject automatically other cases which have already been retrieved. Through the causal model, the case retriever 14 is able to determine the implications of each new piece of information which is learned during the justification of a particular case. This is the first type of learning that the case-based reasoning system performs, as discussed earlier. The causal models are stored in a causal model database 20, coupled to the case retriever 14.

As explained before, each causal explanation has what are known as support steps. Each support step is essentially a violated constraint. In order to be able to match the causal explanation of a retrieved case to a new problem, each support step in a causal explanation of that retrieved case will point to the step of the causal model (a "causal model step") that provided a value which the constraint violates. In other words, the causal model steps provide values, and a support step in a causal explanation will point to that causal model step that had a value for which there was a constrain violation. In this way, all of the retrieved cases are "attached" to a causal model step. Each causal model step has a test associated with it. A causal model step may have several tests associated with it.

In the second process, the justification process, the case retriever 14 initially places all the cases that have been returned, based upon the symptoms of the new problem, into a set called "the retrieved set". A case is selected from the retrieved set, this selected case being termed "the candidate case". The first support step of the candidate case is invoked. This causes the execution of the test which is associated with the causal model step to which the support step points on the new problem. The execution of this test results in the acquisition of the data that corresponds to the constraint that is associated with the invoked support step.

If the acquired value is identical to that in the support step, then all of those retrieved cases in the retrieved set which are attached to the same causal model step are placed by the case retriever 14 into a set which is termed "the active set". The active set is thus a subset of the retrieved set, and contains the cases which the case reasoner 14 is actively attempting to justify. Every case in the active set is a candidate for being justifiably relevant. If the acquired value is not identical to that of the support step, then the case retriever 14 has to determine if the acquired value invalidates the candidate case or if the support step of the candidate case can be adapted. When the support step cannot be adapted as determined through the knowledge of the causal model, then the causal explanation and consequently the candidate case is rejected. Furthermore, all the cases with identical support steps are automatically rejected as well, i.e. removed from the active set.

If there are more support steps to be examined, then the case retriever goes back to the process of invoking other support steps of the candidate case, and executing the test included in the pointed-to causal model steps, and acquiring a value. The support steps are invoked in the strict order in which they exist within a causal explanation.

When there are no more support steps to be justified from the candidate case, that candidate case, as well as all of the cases from the active set that have no more support steps to be justified, are placed in what is known as "the justified set". The cases in the justified set are a subset of the cases in the active set, and are considered to be justifiably relevant. The cases which remain in the active set have causal explanations which are supersets of the causal explanation of the candidate case.

One of the cases that remains in the active set now becomes the new candidate case. The case retriever 14 proceeds again by invoking support steps, etc.

After all of the cases in the active set are eventually either moved to the justified set or are rejected, the case retriever 14 repeats the above process, beginning with the selection of another candidate case from the retrieved set.

When the retrieved set and the active set are empty, and the justified set is not, the cases in the justified set are passed to the case reasoner 16 of system 10. If, however, both the justified sets and the retrieved sets are empty, control is returned to the user of the system.

The following is a description of a specific application of the system 10 that will make more clear the operation and terms that were used above to describe the system 10 in general. The specific application described is that of a case-based reasoning system that solves a problem occurring in a computer operating system. A computer operating system is an integrated collection of programs that controls the execution of computer programs and the computer hardware.

An operating system is able to detect internal errors and issue flags which code each error according to its type. When an internal error is so severe that normal operations cannot continue, the operating system crashes and issues a condition known as a fatal error. If this happens, the operating system shuts itself down in an orderly fashion. In doing so, it saves in a crash dump file the contents of all the processor's registers, the stacks and buffers, as well as the contents of the physical memory at the time the fatal internal error condition is initiated.

Each of the different fatal error condition codes corresponds to a particular type of error. The underlying cause of an error can be, for example, hardware failures, or errors in the operating system software.

Each crash dump file has a header that contains information which is important for acquiring an understanding of the crash. This information, known as either symptoms or surface features, includes the value of the program counter, the name of the process which was running when the crash occurred, and the version of the operating system present in the computer, for example.

Figure 2:
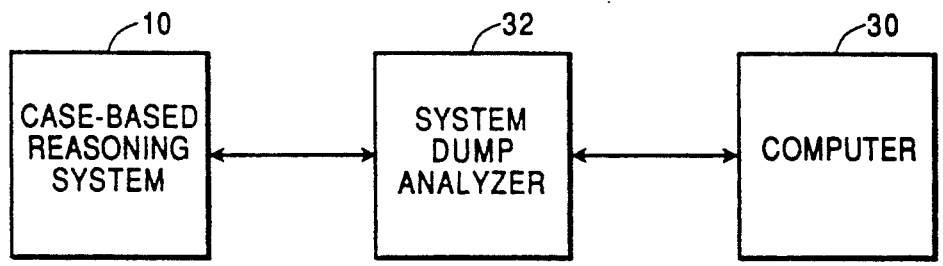
FIG. 2 is a block diagram illustrating an application of the case-based reasoning system of FIG. 1 to solve problems related to the operating system of a computer.

FIG. 2 shows a configuration in which the system 10 of the present invention is able to solve problems occurring in the operating system of a computer 30. A conventional system dump analyzer 32 is coupled between the system 10 of the present invention and the computer 30 that is experiencing problems. The system dump analyzer 32, under control of a user, will analyze the crash dump file contained in the computer 30, and send the analyzed information to the case retriever 14.

As a first step, the case retriever 14 examines the system dump analyzer of the current crash and extracts a condition code and a program counter. By examining the program counter, the case retriever 14 can determine the part of the software (a "software module") where the crash has occurred. From the location of this software module, and semantic knowledge of the operating system contained in the semantic knowledge database 18 (described more fully below), the case retriever 14 is able to identify the software module type. Software module types in an operating system can include a device driver, memory management unit, etc. The case retriever 14 will then broadcast to the case library 12 a message which contains the condition code and the type of module where the crash has occurred. It will also broadcast other information (such as CPU type) whenever this will help constrain the number of cases that will be returned as relevant to the solution of the new problem.

As mentioned above, the semantic knowledge database 18 is used when performing the initial retrieval of cases and contains what is known as general "book knowledge" about the operating system. This knowledge is used by the case retriever 14 in interpreting the symptoms (surface features) that describe a crash, as obtained by the system dump analyzer 32. As an example of semantic knowledge, assume that if an address's most significant digit is 8, it is known that the address belongs to a certain space of the computer's memory. Thus, if the program counter in the current crash points to an address whose most significant digit is 8, then from the semantic knowledge, it is known that the crash has occurred in that certain space of the virtual memory. Some of the semantic knowledge stored in the semantic knowledge database 18 will include the layered structure of the operating system, the virtual address space, and the condition codes associated with each error.

The above process describes the initial retrieval by the case retriever 14 of a collection of cases from the case library 12 that appear to be relevant for the solution of the problem that caused the crash. However, as described in general terms earlier, a second process, that of justification, is used in the present invention in order to provide to the user or to a case reasoner only those cases that are justifiably relevant to the problem being solved. This process involves using an appropriate model from the causal model database 20 in conjunction with a causal explanation of each of the relevant cases in order to explain the cause of the current crash (i.e. the new problem). The retrieved cases whose causal explanation can be successfully used to solve a problem are returned to the user or the case reasoner.

The causal model database 20 contains models of the operation of the various parts of the operating system. For example, the scheduler, the pager, device drivers, etc. of the operating system each have their own models of operation which include the data structures that are accessed by these operating system components. Such models are described in various books and manuals and are encoded into the causal model database 20.

More generally, a causal model can be considered to be a representation of a device's structure and behavior. For a specific causal model, the values which a device is able to output can be derived by using the device's causal model and a set of inputs to the device. In an operating system, the causal model of an operating system component comprises the various modules that comprise the component, the routines which implement the operations of a particular module, the operation steps that each routine performs, the preconditions for and the outcomes of each step, as well as the next step that is implied by each previous step, and the previous step that has caused each next step.

As mentioned before, a causal model can be refined as an expert's understanding of the device's operation increases. For example, when a domain expert in setting up the causal model database 20 first models the device drivers of an operating system, the model may consist of four steps: preprocessing, processing, postprocessing, and AST delivery. If the domain expert later learns that the preprocessing step itself contains several steps, the initial model can be refined to incorporate these steps, provided that the incorporation results in a coherent causal model.

A causal model has two types of components. Active components implement the function of the device which is being modeled, and passive components (data structures) store the results of the processing which is performed by the active components. In the domain of operating systems, the active components are the pieces of code of which the operating system consists. In the present invention, the active components are represented by the causal model steps. The passive components of the models are represented by the data structures of the operating system.

In addition to the active and passive components respectively represented by the causal model steps and the data structures of the operating system, four types of relations and two types of hierarchies are defined to represent the structure and the function of the causal model. The relations are "precondition", "output", "implication" and "causal", while the hierarchies are "consists-of" and "part-of" Each of these will be treated separately below and described with respect to the example shown in FIG. 3 of the causal model of a device driver. (A device driver is a program that provides communication between a hardware device such as a line printer and an operating system.)

Figure 3:
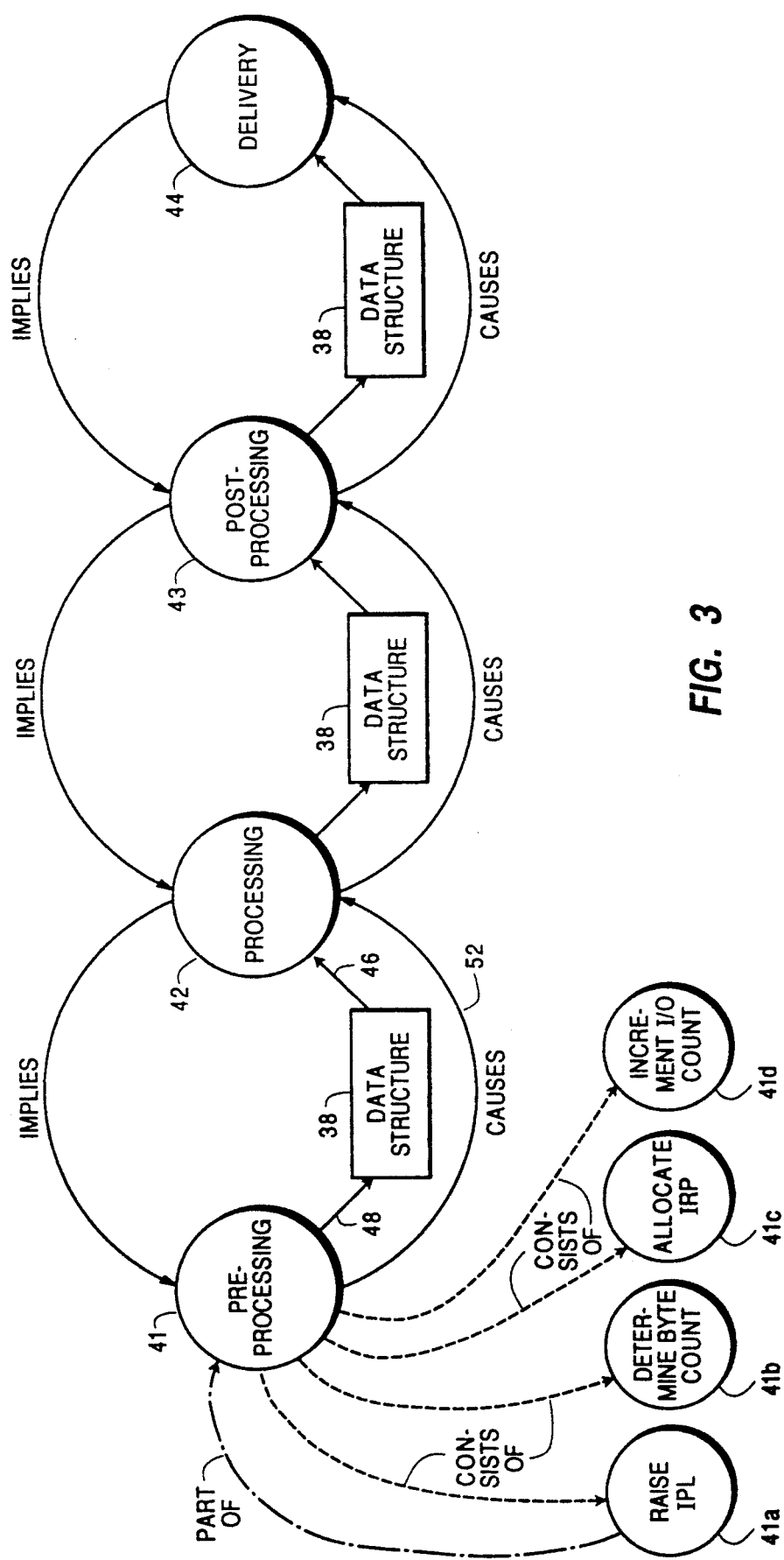
FIG. 3 is a schematic representation of a causal model used in the case-based reasoning system of FIG. 1.

FIG. 3 shows a causal model with four causal model steps: preprocessing step 41; processing step 42, postprocessing step 43; and delivery step 44. Every step of a causal model accepts one or more inputs and, after processing them, delivers one or more outputs. These inputs are stored in the passive components of the model, which, in the given example, are the data structures 38. Without its required inputs, a step cannot execute. In other words, the inputs to a causal model step act as "preconditions" which have to be satisfied before the causal model step is able to execute. A precondition relation is used in order to connect an active component with a passive component, i.e. a piece of code with a data structure. For example, a data structure 38 which is used during the operation of a driver in an operating system is "the I/O request package" (IRP). In a four module model of the operating system driver's operation, the data structure 38 represented by the IRP is linked with the processing step 42 via a precondition relation 46, since the IRP has to be defined in order for the processing step to execute. An IRP is defined during the preprocessing step 41.

The output of each causal model step 41,42,43,44 is stored in a passive component, one of the data structures 38 in this example. An "output" relation links an active component (i.e. a piece of code) with the appropriate data structure 38. For example, the definition of the data structure 38 (namely, the specification of certain of its fields) is the output of the preprocessing step 41 of the device driver's causal model. This is expressed by output relation 48. The output of one step may serve as one step of the precondition to another step, e.g. the data structure 38 (the output of the preprocessing step) will serve as the input of the processing step 42.

The third and fourth relations in the causal model are the "implies" and "causal" relations. When the precondition of a causal model step 41-44 has not been satisfied, the step 41-44 cannot execute. For this reason, the causal model step which can satisfy this precondition has to be found. In other words, the step whose output serves as the input to the current step must be found and executed. In order to identify such a causal model step, an implies relation must be defined between two causal model steps, indicating that the execution of the first causal model step implies that the second causal model step has already been executed. As an example, there is an implies relation 50 from the processing step 42 to the preprocessing step 41 of the device driver's model indicating that the execution of the processing step 42 implies that the preprocessing step 41 has already been executed.

The reverse of the implies relation is the "causal" relation. This is a relation that connects two steps in the causal model. However, rather than connecting a step with another which has to be executed before the first one, as does the implies relation, the causal relation connects a causal model step with another that has to be executed after the first causal model step has been executed. In other words, the causal relation indicates that the successful execution of the first step causes the execution of the second step. As an example, a causal relation 52 indicates that the successful execution of the preprocessing step 41 causes the execution of the processing step 42. By defining these relations (causal and implied) between any two steps, one can identify the sequence of causal model steps which needs to be executed between any two specified causal model steps that belong to the causal model.

There are two different hierarchies in the causal model. The "consists-of" hierarchy relates to refinements that are associated with an original causal model. For example, the preprocessing step 41 can be refined to four substeps 41a,41b,41c,41d. For example, the preprocessing step 41 may consist of substeps: raise IPL (41a); determine byte count (41b); allocate IRP (41c); and increment I/O count (41d). The system 10 of the present invention, while it is gathering more information about what may have caused the crash, will use this hierarchy in order to access a more detailed causal model than the one specified in the causal explanation of the retrieved case.

The "part-of hierarchy" is the reverse of the consists-of hierarchy. The part-of hierarchy links a more detailed, lower level causal model with an equivalent, more abstract causal model. For example, the steps 41a–41d which are performed during the preprocessing step 41 of a device driver's operation may be too specific to be useful in explaining the crash. This can happen if a case explains a crash in terms of a lower level causal model which incorporates many steps, but it is not possible to obtain enough information from the crash dump file of the current crash to explain the current crash using this lower level causal model. If this occurs, then the part-of relation is used to access the next higher level (more abstract) causal model. This next higher level causal model will be one in which the operation of the device driver is viewed as consisting of only four steps (41–44), and this higher level causal model is used in conjunction with another retrieved case which explains a crash in terms of this higher level causal model in order to find the cause of the new problem.

In addition to linking causal models with either a more refined model or a more abstract model, the consists-of and part-of hierarchies are also able to be used with the passive components of the causal model. In particular, the consists of hierarchy is used to link a data structure with its individual fields or with smaller parts of the data structure itself. The part-of hierarchy links a field or part of a data structure with the data structure to which it belongs. By establishing these links, the system 10 can derive certain relations between the data structures. For example, if a data structure points to a null process, then a component of that data structure will also point to a null process. These relations are used during the causal explanation replay process, described later.

As mentioned earlier, causal explanations are used in the justification process so that only justifiably relevant cases are presented to the user of the system 10. A causal explanation is an annotation, or summary, made by the technician or user who inserted a case in the case library 12. This annotation is the complete causal chain which explains the reason of the crash that is described in the case.

Figure 4:
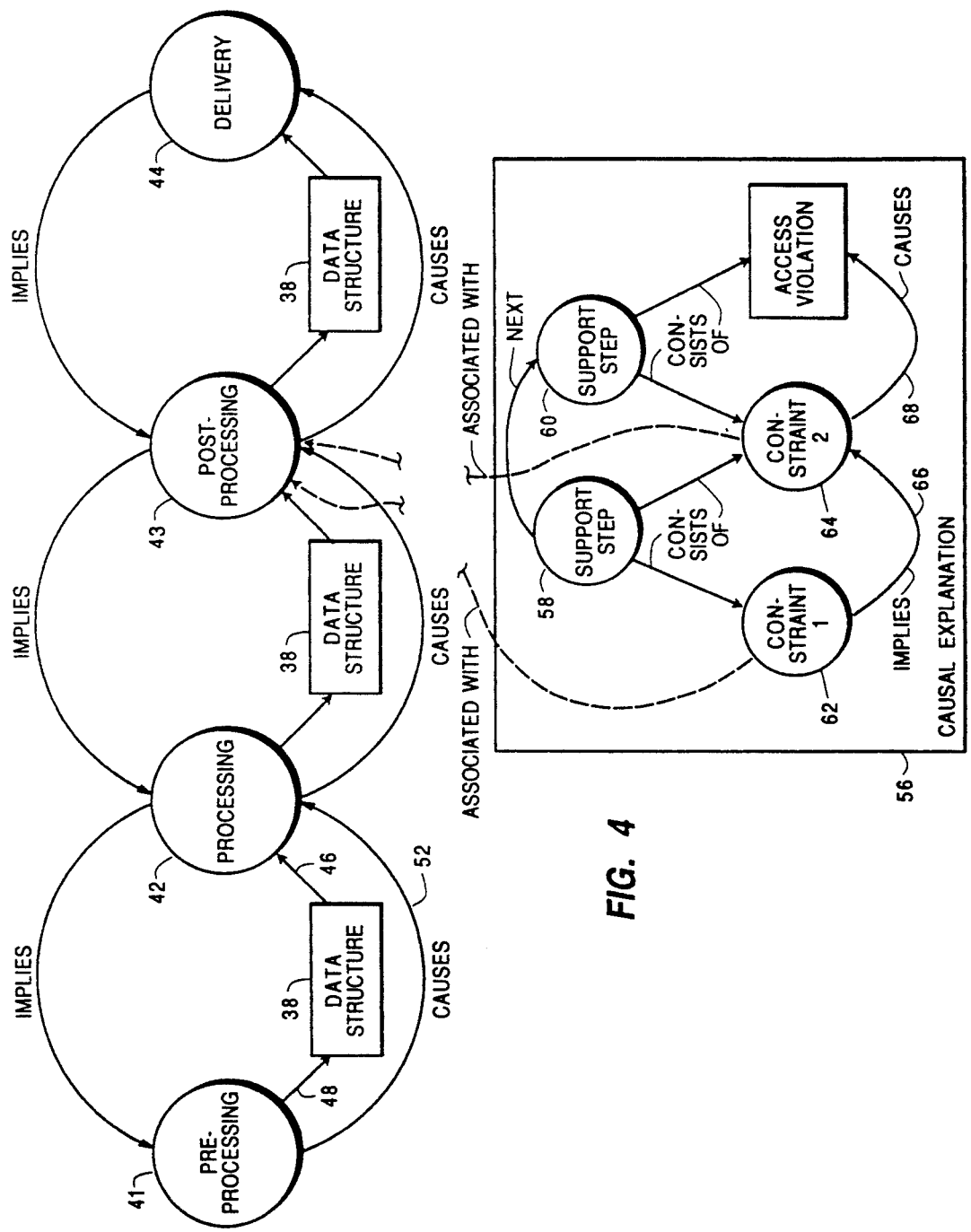
FIG. 4 is a schematic diagram of a causal explanation used in the case-based reasoning system of FIG. 1.

An example of a causal explanation is shown in FIG. 4. In this figure, a causal explanation 56 is shown to be made up of support steps 58,60. Each support step 58,60 has associated with it at least one constraint 62,64 and expresses one of two relations which pertains to the crash that is described in the case, the "implies" relation and the "causes" relation. The implies relation 66 is used for expressing a constraint 62 whose violation has led to the crash that is described. The causes relation 68, by contrast, expresses the constraint violation that led to the crash.

Every implies relation 66 has two constraints 62,64 associated with it. The implies relation 66 expresses that the first constraint 62 implies the second constraint 64. A constraint comprises: an operator, an entity, and a value. The entity refers to the passive component of a causal model. The operator describes the relationship between the entity and the value. For example, the constraint "PCB-NULL" indicates that the PCB data structure points to a null process. The relation "PID=0 implies PCB-NULL" can therefore be interpreted as: the PID being equal to zero implies that the PCB points to a null process. Therefore, referring to FIG. 4, the first constraint 62 is PID=0, which implies the second constraint 64, PCB-NULL.

The causes relation 68 associates a constraint 64 with a condition code 70 which was issued by the operating system when the crash occurred. For example the relation "PCB-NULL causes access violation" can be interpreted as: an access violation is caused by the PCB pointing to a null process. In FIG. 4, the second constraint 64 is PCB-NULL, which is associated by the causes relation 68 to condition code 70, which in this example is an access violation.

Associated with each constraint 62,64 is the causal model step 43 from the particular causal model which was used for the explanation of the case. It is through this association that the case retrieval process is able to verify if the hypothesis which is proposed by the causal explanation of the case, is valid. The process does this by executing the tests associated with the model step 43 and checking whether a constraint 62, 64 is violated.

As described earlier, in the retrieval process, a number of cases will have been initially retrieved using the symptoms of the new problem. At this point, the justification process is used on the initially retrieved cases in order to return only justifiably relevant cases. The justification process involves matching the retrieved cases to the new problem. This is done by interpreting the causal explanation of a retrieved case in the context of the new problem.

Interpreting of the causal explanation involves executing the test of the model step pointed to by each support step 58,60 that is included in a causal explanation 56, and determining if each of the constraints 62,64 which are associated with each support step 58,60 hold in the context of the new problem. In order to obtain the new value of the entity which is included in each constraint 62,64, the case retriever 14 executes the test in the step which is associated with the support step. In the environment of computer operating systems, the test is executed on the crash dump file of the new problem to obtain the appropriate data. In the example of FIG. 4, the causal model step associated with the support steps 58,60, is postprocessing step 43, so it is the causal model step that is executed.

In the process of executing the causal model step, the case retriever 14 may also have to execute one or more other steps in the causal model, in order to achieve the preconditions of the prescribed causal model steps. In order to do that, the case retriever 14 uses the implies and causal relations which have been established between the individual causal model steps 41-44.

Causal explanations 56 that are included with each case play the role of annotations of the complete causal explanation of the crash that is described in the case to which they belong. However, most experts will not include the complete causal explanation in each case in the case library 12. The annotations which they do include in conjunction with the device's causal model, allow an expert to recreate the entire causal chain. In a similar manner, by executing causal model steps in order to obtain the preconditions to the step specified by a constraint, the system 10 of the present invention may create the complete causal chain whose annotation is contained in the causal explanation of the case that is being considered. In the process, the system 10 determines the data structures as well as the values to particular data structure fields that were not specified in the causal explanation which is associated with a retrieved case.

As an example, in order to obtain the value of the PID (the "process ID"), the system must have the starting address of I/O request package (IRP). Therefore, in addition to features such as PID, and PCB, which have been explicitly mentioned in the causal explanation (in particular, in the constraints which are associated with each support step), the case retriever 14 can use features (data structures and data structure fields) which are revealed during the replay of the causal explanation. These newly revealed features can then be used as indices in order to select a subset of the cases which is believed to be relevant for solving the new problem.

An example of a selection of a subset of cases is as follows. If one of the constraints in the causal explanation of a case is PCB-NULL and the model step execution process reveals that this constraint does not hold, this implies that all of the cases which have been previously retrieved and which also include this constraint can be discarded. Furthermore, since the violation of the above constraint implies that the HPCB will not be pointing to a null process (because the HCPB is "part-of" the PCB) all of the retrieved cases which had the constraint HCPB-NULL can also be discarded.

Although the above description of a specific application of the invention to solving problems of a computer operating system should be clear to one of ordinary skill in the art, another example of an application of the case retrieval system of the present invention will be described. The example is from the domain of automobile repair.

A car mechanic, using the case base reasoning system of the present invention, will use surface features in order to retrieve from the case library 12 a set of cases which initially appear to be relevant to the car's problem (the new problem). In this domain, the surface features are the following: make of the car, model year, engine type, miles on odometer, and a short description of the problem.

For this example, the new problem has the following surface features:

| NEW PROBLEM | |
|---|---|
| MAKE: | X |
| MODEL: | 626 |
| MODEL YEAR: | 1985 |
| ENGINE TYPE: | 2.0 L, Fuel injected |
| MILES: | 40,000 |
| PROBLEM: | Engine does not start |

This new problem is input into the case retriever 14, which uses the surface features to retrieve cases from the case library 12. These cases are placed in the retrieved set. This is the first part of the process of retrieving justifiably relevant cases. The second part of the process, the justification process, must now be performed.

Assume that the case retriever 14, using the surface features of the new problem set forth above, initially retrieves three cases from the case library 12 and puts these cases into the retrieved set. Assume that the three cases in the retrieved set have the following information:

| CASE 1 | |
|---|---|
| MAKE: | X |
| MODEL: | 626 |
| MODEL YEAR: | 1988 |
| ENGINE TYPE: | 2.0 L, fuel injected |
| MILES: | 10,000 |
| PROBLEM: | Engine does not start. |
| CAUSE: | The fule injector was clogged. As a result could not deliver any fuel for the ignition of the engine. which caused the engine to not be able to start. |
| SOLUTION: | Cleaned the fuel injector. |
| CASE 2 | |
| MAKE: | X |
| MODEL: | 626 |
| MODEL YEAR: | 1984 |
| ENGINE TYPE: | 2.0 L, normally aspirated |
| MILES: | 60,000 |
| PROBLEM: | Engine does not start. |
| CAUSE: | The car has a faulty gas pump, which caused no fuel to be delivered to any part of the engine, which resulted in the engine not starting. |
| SOLUTION: | Replaced the gas pump. |
| CASE 3 | |
| MAKE: | X |
| MODEL: | 626 |
| MODEL YEAR: | 1987 |
| ENGINE TYPE: | 1.8 L, normally aspirated |
| MILES: | 20,000 |
| PROBLEM: | Engine does not start. |
| CAUSE: | A leak existed in the gas tank, which caused the gas to drain on the floor. As a result there was no fuel being delivered through the fuel line to the engine, and the car did not start. |
| SOLUTION: | Fixed the leak in the gas tank. |

The comparison of the surface features of cases 1-3 with the new problem shows a matching of most of the surface features. One of the surface features, the engine type, has been ignored for purposes of the initial retrieval so that normally aspirated engine types, of both 1.8 liter and 2.0 liter size, are retrieved in order to get a large enough retrieved set.

The case retriever 14 now must determine which of the three cases in the retrieved set are justifiably relevant to the new problem. The case retriever 14 examines the first case, case 1, which now becomes the candidate case. The causal explanation of the candidate case is examined to determine how well the causal explanation matches the situation of the new problem.

The first support step of the candidate case is invoked. This causes the execution, in the new problem, of the test of the model step to which the support step points. The constraint is "fuel injector clogged". The model step is that the fuel injector delivers fuel for the ignition of the engine. This action results in the acquisition of the value which corresponds to the relation that is associated with the invoked support step. In this example, the test is performed by the mechanic. If case 1 is the candidate case, the mechanic will perform a check to see if there is gas in the small reservoir which feeds gas to the fuel injector. This will determine if the fuel injector has a problem. Assume that this test reveals that there is gas in the reservoir. The case retriever 14 will learn the result of this test from the mechanic. This is the first type of learning, mentioned earlier, that is performed by the present invention. By referring to the model of the car contained in the component causal model data base 20, the case retriever 14 determines if this type of reservoir also exists in cars with normally aspirated engines.

Moving on to the next support step ("could not deliver fuel"), the case retriever 14 instructs the mechanic to check the line which delivers fuel from the reservoir to the fuel injector in a car that has the new problem. Assume that the line is not clogged. As a result, the causal explanation of case 1 does not apply to the new problem. Furthermore, since the case retriever 14 has learned that there exists gas in the small reservoir, so that there is fuel in the engine, and that this reservoir can also be found in normally aspirated engines, the case retriever 14 concludes with a high degree of certainty that the causal explanation of case 2 also does not apply to the new problem. This is because the causal explanation of case 2 explicitly states that the faulty gas pump results in no fuel being delivered to the engine. This is an example of a second case that is rejected and removed from the retrieved set based upon information learned during the justification of a first case.

Since cases 1 and 2 have been removed from the active set, a new candidate case is evaluated. This will be case 3, which the case retriever 14 will attempt to justify. The case retriever 14 invokes the next support step ("leak existed in gas tank") which has the mechanic perform the necessary tests in order to determine if there is a leak in the fuel line of the car with a new problem. The mechanic first looks at the fuel gauge on the dashboard of the car to determine if it indicates an empty tank. Assume that the gauge indicates that there is fuel remaining in the tank. The mechanic will then check the fuel line and there, let us assume, he finds a leak. The causal explanation of the third case will not apply exactly. However, it can partially explain the cause of the problem. The case retriever 14 then adapts the parts of the explanation of case 3 that do not match the situation in the new problem, so that it can explain the new problem exactly. The mechanic replaces the fuel line and solves the new problem.

At this point, the car mechanic, i.e., the user, makes a decision to store the new problem as a case in the case library 12. The new case will be complete with a casual explanation and a solution. This addition of a new case to the case library 12 is the second type of learning that is performed by the case based reasoning system.

Using the apparatus and method of the present invention, only justifiably relevant cases will be returned to the user, so that the solution to a problem may be quickly ascertained. Although a specific application of the case retrieval system of the present invention has been described, application of this system to other domains is contemplated. For example, the system can be used in the field of routine design or in the troubleshooting of hardware, troubleshooting of software, medical diagnosis, scheduling, process design, credit analysis, investment banking and is not limited to the domain of troubleshooting computer operating systems.

What is claimed is:

1. A method of performing case retrieval with a computer that incorporates a case-based reasoning system that has a case library, a case retriever and a case reasoner, comprising the steps of:
    (a) obtaining symptoms of a problem;
    (b) retrieving a set of cases stored in a case library based on the symptoms of said problem, each said case comprising symptoms, a causal explanation, and a solution;
    (c) determining for a case in said set of cases whether that case is justifiably relevant to said problem based on the causal explanation of the case, if the case is determined to be justifiably relevant then step (d) and if the case is determined not to be justifiably relevant then step (e);
    (d) automatically accepting as justifiably relevant certain other cases of the retrieved set of cases that are similarly relevant based on information learned during determining step c, then step (f);
    (e) automatically rejecting as not justifiably relevant certain other cases of the retrieved set of cases that are similarly not relevant based on the information learned during determining step (c);
    (f) repeating step (c) through (e) for the remaining cases of the retrieved set of cases; and
    (g) returning to a user of said case-based reasoning system those cases that have been determined to be justifiably relevant to said problem.

2. The method of claim 1, wherein the automatically accepting and rejecting steps further comprise learning whether said cases in said set of cases are justifiably relevant to said problem based upon information obtained during said determining step c, and accepting a first class of cases learned to be justifiably relevant and rejecting a second classes of cases learned to be not justifiably relevant without explicitly matching their casual explanation to said problem.

3. The method of claim 2, further comprising storing the symptoms of said problem, a causal explanation, and a solution of said problem in said case library as an additional case if said problem is solved.

4. The method of claim 3, wherein said determining step includes attempting to match a casual explanation of a retrieved case to said problem.

5. The method of claim 4, wherein the step of attempting to match a causal explanation further comprises using a causal model with the causal explanation.

6. An arrangement for providing justifiably relevant solutions to problems of a computer operating system of a computer, comprising:
    (a) a system dump analyzer for coupling to a computer, said system dump analyzer for obtaining information from the computer related to an operating system crash; and (b) a case-based reasoning system coupled to said system dump analyzer and including a case library and a case retriever, said case retriever operating to retrieve a set of relevant cases from the case library and to determine whether a case of the relevant cases is justifiably relevant based on information obtained by the system dump analyzer, said case retriever automatically accepts as justifiably relevant certain ones of the retrieved set of cases determined to be similarly relevant based on information learned during justification of said case or automatically rejects as not justifiably relevant certain ones of the retrieved set of cases determined to be similarly no relevant based on information learned during justification of said case, and said case retriever accepts as relevant and rejects as not relevant the remaining cases in a same manner.

7. The arrangement of claim 6, wherein the case-based reasoning system further includes a semantic knowledge database coupled to the case retriever, a component causal model database coupled to the case retriever, and a case reasoner coupled to the case retriever.

* * * * *